May 10, 1966   W. STEFFEN   3,250,044
WOOD BELT GRINDING MACHINE
Filed Feb. 3, 1965   2 Sheets-Sheet 1
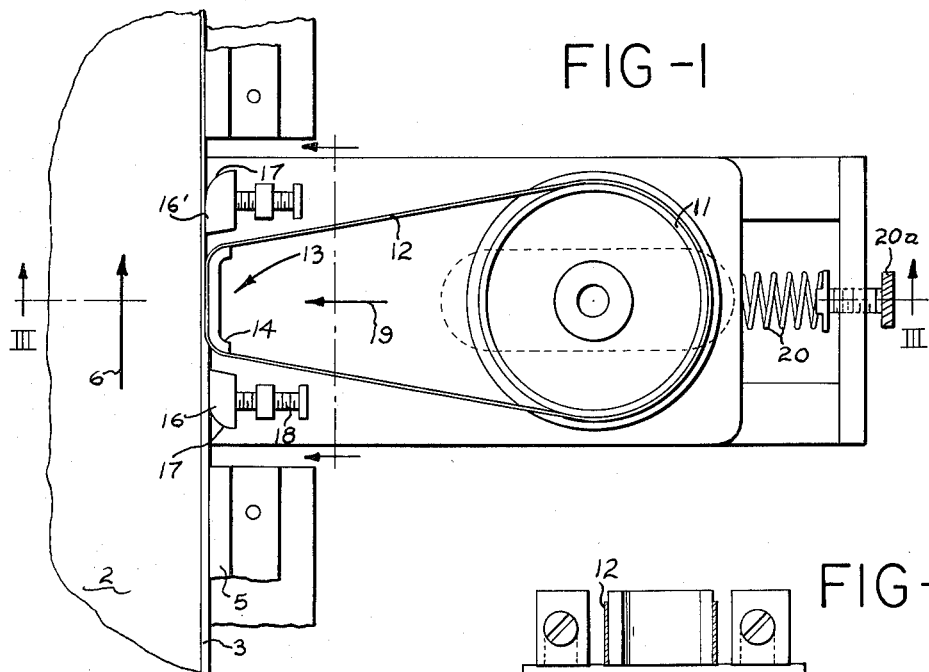
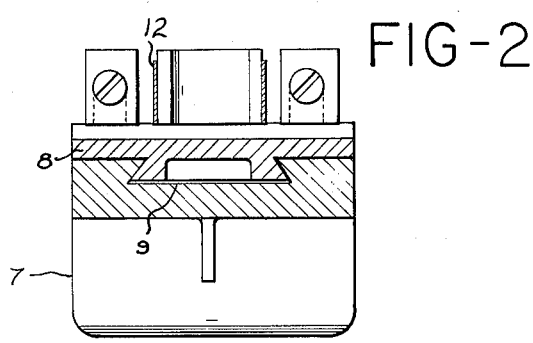
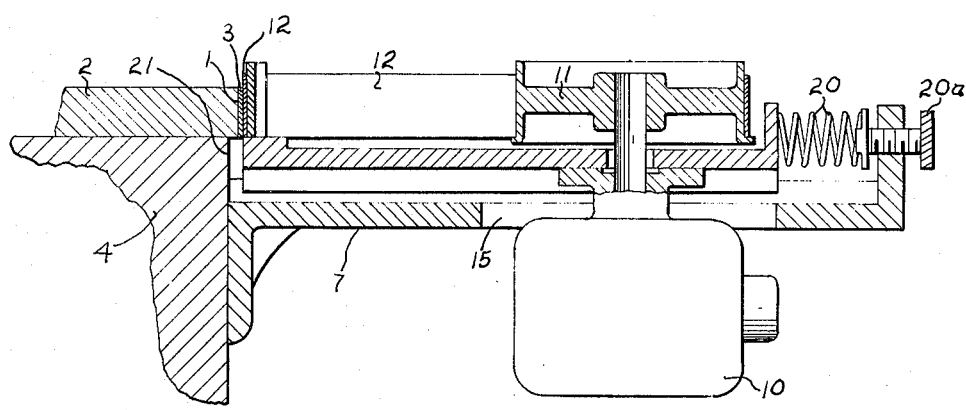
INVENTOR.
WERNER STEFFEN
BY

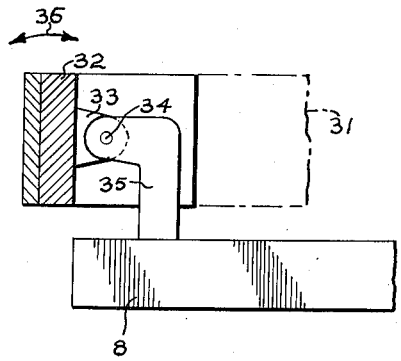
FIG-6
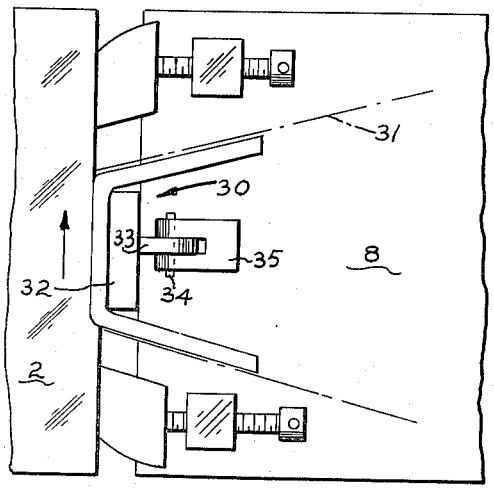
FIG-4
FIG-5
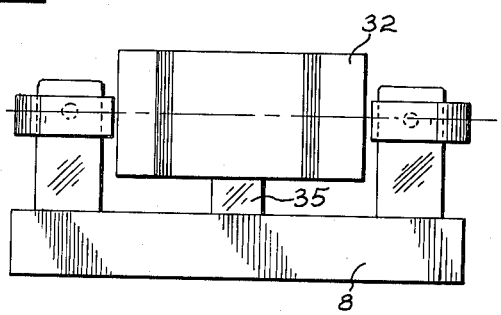
FIG-7
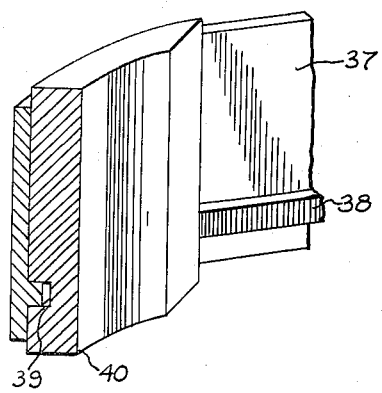
INVENTOR.
WERNER STEFFEN United States Patent Office 3,250,044
Patented May 10, 1966

3,250,044
WOOD BELT GRINDING MACHINE
Werner Steffen, Brelch-Hornheide, near Munster-Lager, Germany
Filed Feb. 3, 1965, Ser. No. 430,050
Claims priority, application Germany, Feb. 3, 1961,
St. 17,420
7 Claims. (Cl. 51—141)

The present invention relates to a grinding machine, and more particularly, to a band grinding or sanding machine for the machining of wood. While not limited to, the machine according to the present invention is particularly intended for grinding or sanding veneered wood especially for narrow veneered surfaces as for instance the end faces of veneered table plates, cupboard plates or the like. This application is a continuation-in-part of my copending application, Serial No. 169,541, filed January 29, 1962 entitled "Grinding Machine, Especially Band Grinding Machine for the Machining of Wood" and now abandoned.

With heretofore known machines of the type involved, the grinding heads are stationarily mounted. Since, furthermore, the abutment or guiding elements form a rigid guiding means for the work piece, it is unavoidable that, with workpieces having irregular surfaces, the veneer will be damaged or even entirely removed by the grinding operation.

It is, therefore, an object of the present invention to provide a grinding machine of the above mentioned general type for the machining of wood, which will overcome the above mentioned drawbacks.

It is another object of this invention to provide a grinding machine, especially a band grinding machine, for the machining of wood, in which the grinding head will be able to follow the course of the surface to be ground so that damage to the veneer will be eliminated.

It is also an object of this invention to provide a grinding machine as set forth in the preceding paragraph in which the results obtained by the grinding operation will be independent of the skill of the operator.

It is a still further object of this invention to provide a grinding device, especially for grinding wood, which will be inexpensive and which will permit the employment of the grinding unit as an accessory for heretofore built grinding machines.

These and other objects and advantages of the invention will become more apparent from the following specification taken in connection with the accompanying drawing, in which:

FIGURE 1 is a top view of a grinding machine for veneered wood according to my invention;

FIGURE 2 is a section taken along the line II—II of FIGURE 1;

FIGURE 3 is a longitudinal section along the line III—III of FIGURE 1;

FIGURE 4 is a fragmentary plan view of a modification;

FIGURE 5 is a view looking in from the left side of FIGURE 4;

FIGURE 6 is a sectional view taken on line VI—VI of FIGURE 5; and

FIGURE 7 is a sectional perspective view of a modification.

General arrangement

The present invention is characterized primarily in that the grinding unit, at least the grinding head or that portion of the unit which is adjacent the surface to be ground, is movably mounted so as to be resiliently yieldable in a first direction at right angles to the feeding direction of the work piece so that said grinding unit or grinding head will be able to carry out adjusting movements automatically while maintaining a practically uniform grinding pressure.

In view of this automatic adjusting movement, the grinding head can follow the surface to be ground whereby damage to the veneer will be eliminated. Consequently, the arrangement according to the invention will also be suitable for manual operation. Moreover, the guiding of the work piece does not have to be carried out with high precision.

Still further, the grinding element in the form of a belt is supported by a tiltable element at the grinding position so as to be able to follow irregularities in the work piece surface in a second direction at right angles to the first direction referred to. The belt may be guided on the tiltable element to prevent the belt from creeping on the element.

Structural arrangement

Referring now to the drawings more in detail, it is assumed that the end surface 1 of the work piece 2, which may be a panel, is provided with a veneer layer 3 which is to be ground or finished by sanding. The grinding or sanding operation is to be effected by supporting panel 2 on a work table 4 and holding it against rigid abutment strips 5 and moving the panel along the strips 5 in the direction of the arrow 6.

Connected to the work table 4 is a bracket 7 which includes dovetail guiding means 9 on which there is displaceably mounted a carriage 8. Carriage 8 serves for supporting the grinding unit proper which comprises a flange mounted motor 10, a drive wheel 11 supported on the motor output shaft. A grinding head 13 and a grinding or sanding band 12 entrained over wheel 11 and head 13.

Grinding head 13 in its turn is formed by a curved guiding metal member 14 or the like fixed to carriage 8 at the end thereof adjacent table 12. Motor 10, according to the particular construction shown in the drawing, is arranged below the carriage 8 and is bolted thereto. In order to assure that with this arrangement of the motor, the movement of the carriage 8 can be properly carried out, the bracket 7 is provided with an oblong opening 15 in which the upper portion of motor 10 is arranged with sufficient play. The lower edge of belt 12 is substantially coplanar with the surface of table 4.

At both sides of the grinding head 13 on carriage 8, guiding elements are provided which, according to the specific showing of FIGURE 1, are in the form of guiding strips 16, 16' with slanted or rounded surfaces 17. It will be understood, however, that the guiding elements may be formed by any other suitable elements as, for instance, guiding rollers. The position of these guiding strips in the longitudinal direction of the bolts 18 may be varied by adjustment of said threaded bolts 18 so that carriage 8 can be guided in its movement toward and away from the edge of panel 2 in conformity with the material removed by the grinding operation. The guiding strip 16 is thus located ahead of the plane in which the guiding strip 16' is located, by an amount equal to the thickness of the ground-off layer.

Between carriage 8 and bracket 7 there is provided a pressure spring 20 which is preferably adjustable in any convenient manner, for instance by means of an adjusting screw 20a. This pressure spring 20 determines the grinding pressure and is so designed that it has a substantially flat characteristic in order to obtain substantial uniformity of grinding pressure for various positions of the carriage. In this way, a practically uniform pressure will be assured at the grinding head 13, and this also when, in view of the spring 20, an adjusting movement is effected in the direction of the arrow 19 due to irregularities on the work piece 2. If the operator will see to it that the work piece 2 properly rests against the abutment strips 5, a proper grinding will be assured.

It will be appreciated that the guiding members 16, 16' directly engage the edge of the work piece and control the depth of cut so that cutting is rapid and uniform and what is removed from the work piece is only that amount necessary to provide the work piece with a smooth fiinished edge. The guiding strips 16, 16' may, if desired, also be curved in case correspondingly shaped work pieces are to be machined. Also the grinding head 13 may be shaped differently.

It may, furthermore, be mentioned that the carriage 8, which is under the influence of spring 20, will, when the machine is not in use, rest against an abutment, for instance the end face 21 of the work table 4 while the guiding members 16, 16' and the guiding head 13 slightly protrude beyond the abutment strips 5. If the machine is now to be operated and the work piece 2 is fed toward the grinding head 13, the work piece will first engage at least one of element 16, 16', for example, the surface 17, so that the carriage 8 will be pushed back against the thrust of spring 20 until the carriage occupies the desired position of operation.

In FIGURES 4, 5 and 6 the head 30 about which grinding or sanding belt 31 passes, is in the form of a metal strip 32 having a lever 33 attached to the back which is pivotally supported by pin 34 in support arm 35 fixed to carriage 8. This arrangement permits the belt 31 to tilt in a vertical plane to follow irregularities of the edge of the work piece. Arrow 36 shows the tilting direction of strip 32.

In FIGURE 7, the grinding or sanding belt 37 has at least one bead 38 on the back which engages a groove 39 in the member 40 in the strip which supports the belt at the working station. The drive pulley for the belt would also, of course, have similar groove means. The bead means and groove means prevent the belt from slipping laterally of the supporting head or drive pulley, even where the head is in the form of a tiltable strip as in FIGURES 4, 5 and 6.

It is, of course, to be understood that the present invention is, by no means, limited to the particular construction shown in the drawing but also comprises any modifications within the scope of the appended claims.

What is claimed is:

1. An apparatus for grinding wood, especially the lateral edges of substantially flat veneer wood work pieces, which comprises: table means for receiving the work piece to be ground and over which the work piece is to be fed in a certain feed direction, a carriage unit having a grinding belt means and a belt guide member mounted thereon, said guide member being located adjacent the nearest lateral edge of said work piece, said belt means passing over said guide member and in contact with said lateral edge of said work piece for grinding engagement therewith, said carriage unit being provided with guide means guiding said carriage unit for movement toward and away from said work piece on said table means and in a lateral direction substantially perpendicular to the direction in which said work piece is fed, means resiliently and yieldably urging said grinding belt means bodily toward said table means, and guiding strips rigidly but adjustably carried by said carriage unit on opposite sides of said belt guide member, and providing a positive stop for the belt means in its movement toward the workpiece, said guiding strips being laterally adjustable on said carriage unit independently of each other.

2. An apparatus for grinding wood, especially the lateral edges of substantially flat veneer woodwork pieces which comprises: table means for receiving the work piece to be ground and over which the work piece is to be fed in a certain feed direction, a carriage unit having a grinding belt means and a belt guide member and a belt drive wheel mounted thereon, said guide member being located adjacent the nearest lateral edge of said work piece, said belt means passing over said guide member and said drive wheel and having a region of contact with said lateral edge of said work piece for grinding engagement therewith, said region of contact being that region where the belt passes over said guide member, said carriage unit being provided with guide means guiding said carriage unit for movement from said work piece on said table means in a lateral direction substantially perpendicular to the direction in which said work piece is fed, means resiliently and yieldably urging said grinding belt means bodily toward said supporting means, and guiding strips rigidly but adjustably carried by said carriage unit on opposite sides of said belt guide member, said guiding strips being laterally adjustable independently of each other whereby one thereof engages the unfinished edge of the work piece in advance of said grinding belt means while the other thereof engages the edge of the work piece behind the said grinding means.

3. An apparatus for grinding wood, especially the lateral edges of substantially flat veneer wood work pieces, which comprises: table means for receiving the work piece to be ground and over which the work piece is to be fed in a certain feed direction, a carriage unit having a grinding belt means and a belt guide member and a belt drive wheel mounted thereon, said guide member being located adjacent the nearest lateral edge of said work piece, said belt means passing over said guide member and said belt drive wheel and having a region of contact with said lateral edge of said work piece for grinding engagement therewith, said region of contact being that region where the belt passes over said guide member, said carriage unit being provided with guide means guiding said carriage unit for movement toward and away from said work piece on said table means and in a lateral direction substantially perpendicular to the direction in which said work piece is fed, means resiliently and yieldably urging said grinding belt means bodily toward said table means, and guiding strips rigidly but adjustably carried by said carriage unit on opposite sides of said belt guide member, and providing a positive stop for the belt means in its movement toward the work piece, said guiding strips being laterally adjustable on said carriage unit in the direction of movement of said carriage unit independently of each other.

4. An apparatus for grinding wood, especially the lateral edges of substantially flat veneer wood work pieces, which comprises: table means for receiving the work piece to be ground and over which the work piece is to be fed in a certain feed direction, a carriage unit having a grinding belt means and a belt guide member and a belt drive wheel mounted thereon, said guide member being located adjacent the nearest lateral edge of said work piece, said belt means passing over said guide member and said belt drive wheel and having a region of contact with said lateral edge of said work piece for grinding engagement therewith, said region of contact being that region where the belt passes over said guide member, said carriage unit being provided with guide means guiding said carriage unit for movement toward and away from said work piece on said table means and in a lateral direction substantially perpendicular to the direction in which said work piece is fed, means resiliently and yieldably urging said grinding belt means bodily toward said table means, and guiding strips rigidly but adjustably carried by said carriage unit on opposite sides of said belt guide member, and providing a positive stop for the belt means in its movement toward the work piece, said guiding strips being laterally adjustable on said carriage unit in the direction of movement of said carriage unit independently of each other, said belt guide member being supported on said carriage unit for tilting movement in a vertical plane.

5. An apparatus for grinding wood, especially the lateral edges of substantially flat veneer wood work pieces, which comprises: table means for receiving the work piece to be ground and over which the work piece is to be fed in a certain feed direction, a carriage unit having a grinding belt means and a belt guide member and a belt drive wheel mounted thereon, said guide member being located adjacent the nearest lateral edge of said work piece, said belt means passing over said guide member and said belt drive wheel and having a region of contact with said lateral edge of said work piece for grinding engagement therewith, said region of contact being that region where the belt passes over said guide member, said carriage unit being provided with guide means guiding said carriage unit for movement toward and away from said work piece on said table means and in a lateral direction substantially perpendicular to the direction in which said work piece is fed, means resiliently and yieldably urging said grinding belt means bodily toward said table means, guiding strips rigidly but adjustably carried by said carriage unit on opposite sides of said belt guide member, and providing a positive stop for the belt means in its movement toward the work piece, said guiding strips being laterally adjustable on said carriage unit in the direction of movement of said carriage unit independently of each other, a pivot member upstanding from said carriage unit behind said belt guide member, and means pivotally connecting said guide member to said pivot member on a horizontal axis positioned in the vertical direction between the top and bottom edges of said belt.

6. An apparatus for grinding wood, especially the lateral edges of substantially flat veneer wood work pieces, which comprises: table means for receiving the work piece to be ground and over which the work piece is to be fed in a certain feed direction, a carriage unit having a grinding belt means and a belt guide member and a belt drive wheel mounted thereon, said guide member being located adjacent the nearest lateral edge of said work piece, said belt means passing over said guide member and said belt drive wheel and having a region of contact with said lateral edge of said work piece for grinding engagement therewith, said region of contact being that region where the belt passes over said guide member, said carriage unit being provided with guide means guiding said carriage unit for movement toward and away from said work piece on said table means and in a lateral direction substantially perpendicular to the direction in which said work piece is fed, means resiliently and yieldably urging said grinding belt means bodily toward said table means, guiding strips rigidly but adjustably carried by said carriage unit on opposite sides of said belt guide member, and providing a positive stop for the belt means in its movement toward the work piece, said guiding strips being laterally adjustable on said carriage unit in the direction of movement of said carriage unit independently of each other, at least one continuous rib extending along the body of the belt in the direction of the length thereof, and groove means in at least said guide member receiving said rib.

7. An apparatus for grinding wood, especially the lateral edges of substantially flat veneer wood work pieces, which comprises: table means for receiving the work piece to be ground and over which the work piece is to be fed in a certain feed direction, a carriage unit having a grinding belt means and a belt guide member and a belt drive wheel mounted thereon, said guide member being located adjacent the nearest lateral edge of said work piece, said belt means passing over said guide member and said belt drive wheel and having a region of contact with said lateral edge of said work piece for grinding engagement therewith, said region of contact being that region where the belt passes over said guide member, said carriage unit being provided with guide means guiding said carriage unit for movement toward and away from said work piece on said table means and in a lateral direction substantially perpendicular to the direction in which said work piece is fed, means resiliently and yieldably urging said grinding belt means bodily toward said table means, guiding strips rigidly but adjustably carried by said carriage unit on opposite sides of said belt guide member, and providing a positive stop for the belt means in its movement toward the work piece, said guiding strips being laterally adjustable on said carriage unit in the direction of movement of said carriage unit independently of each other, at least one continuous rib extending along the body of the belt in the direction of the length thereof, and groove means in said guide member and in said drive wheel for receiving said rib.

References Cited by the Examiner

UNITED STATES PATENTS 3,041,788   7/1962   Carlow _____ 51—87

LESTER M. SWINGLE, *Primary Examiner.*

ROBERT C. RIORDON, *Examiner.*

L. S. SELMAN, *Assistant Examiner.*